US011544784B1

(12) United States Patent
Blackwell et al.

(10) Patent No.: US 11,544,784 B1
(45) Date of Patent: *Jan. 3, 2023

(54) CONSOLIDATED LOAN PRODUCT

(71) Applicant: Wells Fargo Bank, N.A., San Francisco, CA (US)

(72) Inventors: Bradley W. Blackwell, Danville, CA (US); Peter R. Diliberti, Urbandale, IA (US); Mary K. Blue, Minneapolis, MN (US); Lisa M. Thomlinson, Thayer, IA (US); Jonathan M. Holste, Grimes, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 16/986,889

(22) Filed: Aug. 6, 2020

Related U.S. Application Data

(63) Continuation of application No. 15/496,735, filed on Apr. 25, 2017, now Pat. No. 10,783,579.

(60) Provisional application No. 62/340,037, filed on May 23, 2016.

(51) Int. Cl.
 G06Q 40/02 (2012.01)
(52) U.S. Cl.
 CPC .................. *G06Q 40/025* (2013.01)
(58) Field of Classification Search
 CPC .................................... G06Q 40/025
 USPC ...................................... 705/3–44
 See application file for complete search history.

(56) References Cited

U.S. PATENT DOCUMENTS

| | | | |
|---|---|---|---|
| 7,680,728 B2* | 3/2010 | Lazerson | G06Q 30/02 705/38 |
| 7,742,996 B1 | 6/2010 | Kwan | |
| 3,060,438 A1 | 11/2011 | Dhar et al. | |
| 8,468,036 B2 | 6/2013 | Erlanger | |
| 8,556,165 B2* | 10/2013 | Kapis | G06Q 40/00 235/379 |
| 2002/0194120 A1* | 12/2002 | Russell | G06Q 40/025 705/38 |
| 2003/0149659 A1* | 8/2003 | Danaher | G06Q 40/025 705/38 |
| 2005/0097033 A1 | 5/2005 | Pretell et al. | |
| 2007/0271175 A1 | 11/2007 | Shaden | |
| 2007/0299769 A1* | 12/2007 | Fowler | G06Q 40/025 705/38 |
| 2011/0112959 A1 | 5/2011 | Lazerson | |
| 2012/0072246 A1 | 3/2012 | Erlanger | |

(Continued)

OTHER PUBLICATIONS

Ward, "Mortgage rates are great, but beware of the fees", ProQuest Doc. Id. 419670212, Chicago Tribune, Sep. 22, 2002.*

(Continued)

*Primary Examiner* — Frantzy Poinvil
(74) *Attorney, Agent, or Firm* — Merchant & Gould P.C.

(57) ABSTRACT

An example method for facilitating a home mortgage includes: normalizing a plurality of loan products into a consolidated loan product; originating the consolidated loan product for a home purchaser; after origination of the consolidated loan product, determining a best fit for the consolidated loan product from among the plurality of loan products; and transferring the consolidated loan product to an entity associated with the best fit from the plurality of loan products.

20 Claims, 6 Drawing Sheets

(56) References Cited

U.S. PATENT DOCUMENTS

| | | | |
|---|---|---|---|
| 2012/0158573 A1* | 6/2012 | Crocker | G06Q 40/04 |
| | | | 705/38 |
| 2013/0006846 A1 | 1/2013 | Erbey et al. | |
| 2013/0179329 A1 | 7/2013 | Joffrey | |
| 2016/0042451 A1* | 2/2016 | Raessler | G06Q 40/025 |
| | | | 705/38 |
| 2016/0307272 A1* | 10/2016 | Thalken | G06Q 40/06 |
| 2020/0372531 A1* | 11/2020 | Kesiboyana | G06Q 30/0637 |

OTHER PUBLICATIONS

Bolton et al., "Using Loan Plus Lender Literacy Information to combat One-Sided Marketing of Debt Consolidation Loans," Journal of Marketing Research, vol. XLVIII (special Issue 2011), 551-559. (Year: 2011).

"Ed Loan Consolidation Benefits Abound" Credit Union Times, Viewpoint (Year: 2013).

FreddieMac, "Freddie Mac Home Possible® Mortgages," Publication No. 572, Jan. 2017, 4 pages.

FannieMae, "HomeReady® mortgage Built for today's home buyers," Jun. 2017, 2 pages.

FannieMae, "HomeReady® Mortgage Product Matrix," Jun. 2017, 6 pages.

FannieMae, "Expanded 97% LTV Options," Feb. 2017, 2 pages.

FannieMae, "97% LTV Options for Purchases and Limited Cash-Out Refinances of Fannie Mae Loans," May 2017, 4 pages.

* cited by examiner

CONSOLIDATED LOAN PRODUCT

BACKGROUND

The cost of purchasing a home can be the largest single investment for a potential borrower. There are various loan programs, both public and private, that can help to fund the costs of home purchase. These loan programs can offer various loan products to the potential borrower. But, the details associated with each of the loan products, such as eligibility requirements, can be complex and confusing. This can lead to potential borrowers selecting less than optimal loan products, thereby increasing the costs of home purchases.

SUMMARY

Embodiments of the disclosure are directed to an example method for facilitating a home mortgage, including: normalizing a plurality of loan products into a consolidated loan product; originating the consolidated loan product for a home purchaser; after origination of the consolidated loan product, determining a best fit for the consolidated loan product from among the plurality of loan products; and transferring the consolidated loan product to an entity associated with the best fit from the plurality of loan products.

In another example, an electronic computing device includes: at least one processor; and memory encoding instructions that, when executed by the at least one processor, cause the at least one processor to: normalize a plurality of loan products into a consolidated loan product; originate the consolidated loan product for a home purchaser; after origination of the consolidated loan product, determine a best fit for the consolidated loan product from among the plurality of loan products; and transfer the consolidated loan product to an entity associated with the best fit from the plurality of loan products.

DETAILED DESCRIPTION

The present disclosure is directed to systems and methods that facilitate the loan process for the purchase of real estate, such as a home. In these examples, the system consolidates a plurality of loan products from various loan programs facilitated by various agencies to form a consolidated loan product. The consolidated loan product makes the process of selection of a loan easier for a potential borrower by shielding the potential borrower (as well as other associated with the process, such as a home mortgage consultant working with the potential borrower) from many of the complexities associated with each of the plurality of loan products.

The system can facilitate the origination of the consolidated loan for the borrower. Once the consolidated loan is originated, the system can determine which of the plurality of loan products is a best fit for the consolidated loan based upon one or more attributes associated with the plurality of loan products. The system thereupon can dispose of (e.g., sell or otherwise transfer) the originated consolidated loan to an agency associated with the fitted loan product.

The systems and methods described herein result in a more efficient process for facilitating the loan process. The efficiencies include providing a simplified interface to potential borrowers that allow the system to more efficiently process loan requests prior to and after the origination process. The complexities of matching an originated loan to a specific loan program can be performed after origination, using such processes as batch and/or offline processes to do so. This allows the system to process large numbers of originations and dispose of those originated loans in a more efficient manner.

Figure 1:
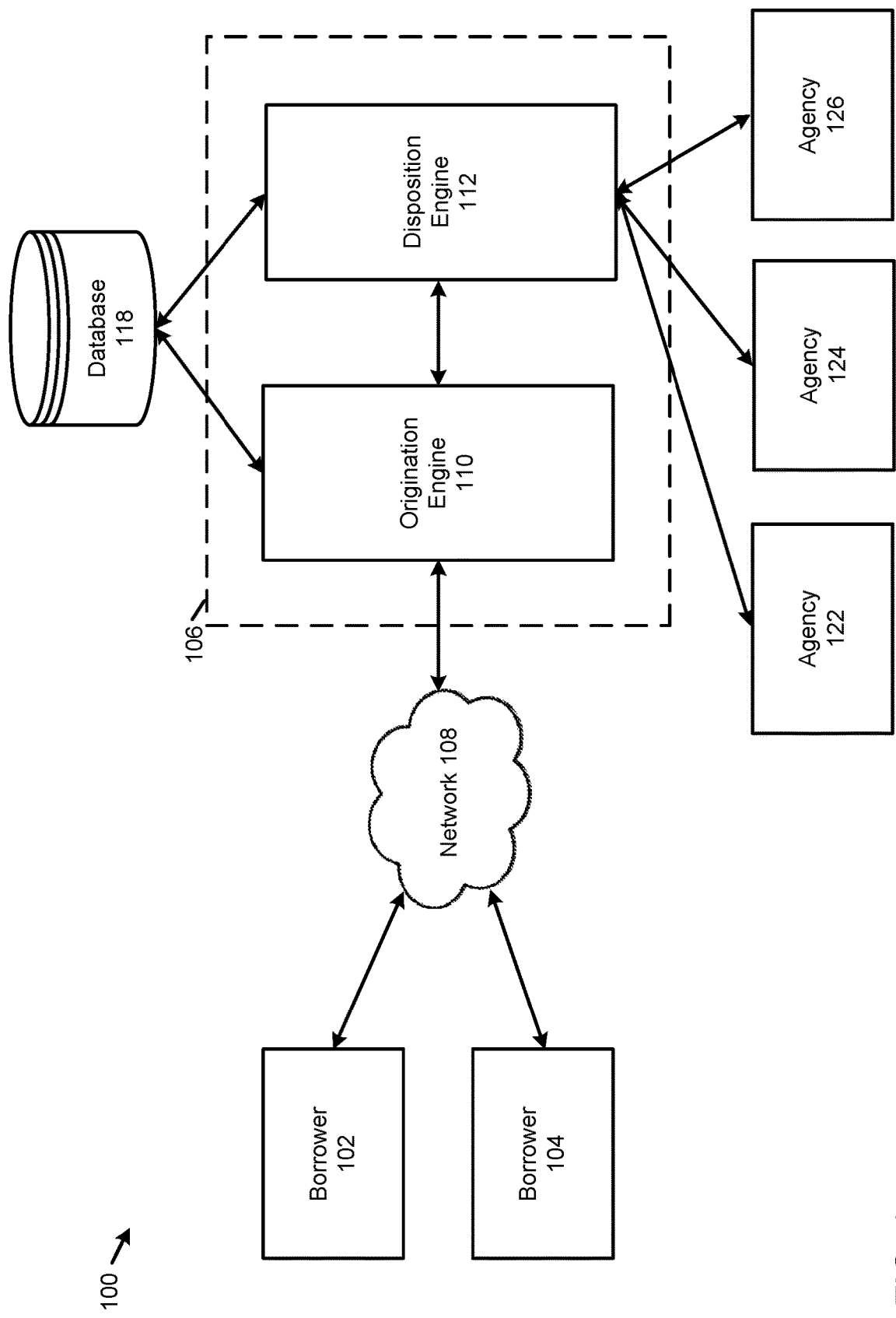
FIG. 1 shows an example system that facilitates a consolidated loan product.

FIG. 1 shows an example system 100 that facilitates the loan process. In this example, potential borrowers 102, 104 use computing devices to communicate with an origination engine 110 through a network 108 using wired and/or wireless schemes.

The origination engine 110 is generally programmed to present a consolidated loan product to the borrowers 102, 104. This consolidated loan product is a normalized loan product based upon a plurality of loan products offered by a plurality of agencies 122, 124, 126, as described further below in reference to FIG. 2.

The origination engine 110 communicates with a disposition engine 112 once a consolidated loan is originated for one of the borrowers 102, 104. The disposition engine 112 is programmed to fit the originated consolidated loan with one or more of the loan products provided by the plurality of agencies 122, 124, 126. The originated consolidated loan can thereupon be disposed of by selling or otherwise transferring the originated consolidated loan to the respective one of the agencies 122, 124, 126, as described further below in reference to FIG. 3.

In some examples, the origination engine 110 and the disposition engine 112 are managed by a financial institution 106, such as a bank. The financial institution 106 provides mortgages to borrowers to purchase homes. The financial institution 106 uses the origination engine 110 and the disposition engine 112 to manage this process.

The system 100 is one example of such a system. More, fewer or different components can be used by the system 100 to accomplish the functionality described herein. For example, the origination engine 110 and disposition engine 112 can be a plurality of computing devices formed in a cloud computing environment.

In this example, the origination engine 110 and disposition engine 112 communicate with a database 118. The database 118 includes loan information associated with the plurality of consolidated loan products. The database 118 can be distributed over a plurality of databases, and the origination engine 110 and disposition engine 112 are programmed to query (e.g., using SQL) the database 118 to normalize, originate, and select a best fit for a consolidated loan product from a plurality of products. Various terms associated with the consolidated loan products and the terms of the originated consolidated loans can be stored in and retrieved from the database 118.

Figure 2:
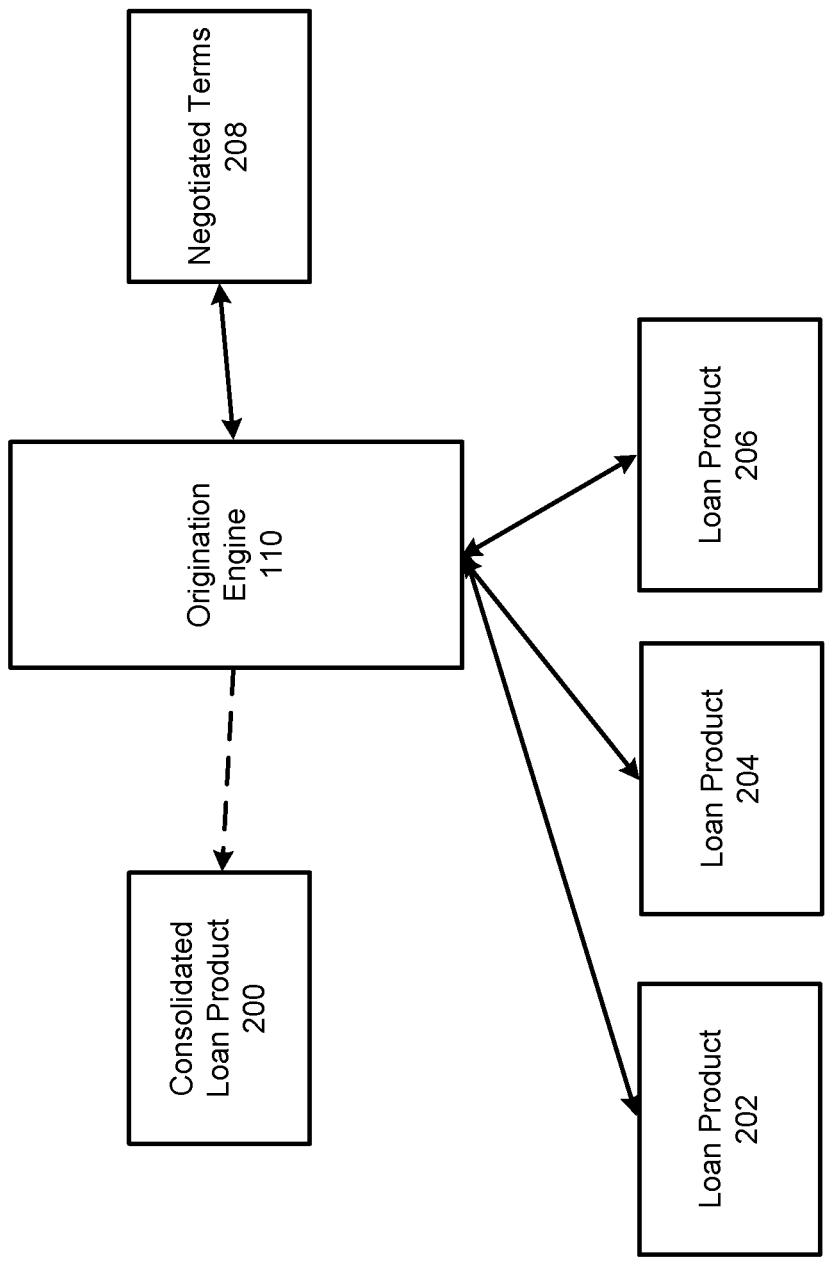
FIG. 2 shows an example origination engine of the system of FIG. 1.

Referring now to FIG. 2, additional details about the origination engine 110 are shown. In this example, the origination engine 110 provides the consolidated loan product 200. The consolidated loan product 200 is a loan product, such as a mortgage for a home. In this example, the consolidated loan product is a combination (i.e., normalization) of a plurality of loan programs from different entities.

For example, the government agency Freddie Mac provides a "Home Possible Program" that includes high loan-to-value terms for first time and lower-income home purchasers. Similarly, the government agency Fannie Mae provides a "HomeReady Program" and a "Conventional 97 Program" that each includes high loan-to-value terms. Each of these loan products has disparate terms, such as different qualification requirements, repayment terms, etc. Other agencies and loan programs can also be included.

The origination engine 110 minimizes the complexities associated with these loan products by normalizing the terms into a single set of terms for the consolidated loan product 200 offered by the origination engine 110. This can be accomplished using various processes.

For example, one term associated with the various loan products offered by the agencies is the percentage of the down payment needed. Some products require a 10 percent down payment, while other products allow for as little as a 5 percent or even 3 percent down payment. Further, the costs associated with the loan programs (e.g., the interest rate) may vary depending on the down payment requirement.

The origination engine 110 normalizes the down payment requirement, as well as the interest rate and other loan terms, into a single offering (e.g., of a single down payment requirement at a given interest rate). This can be accomplished based upon varying rules, such as a determination of how many loans are likely to be originated at each of the different down payment requirements and normalizing a specific single down payment requirement to reflect these likelihoods.

For example, in one optional embodiment, if three products are provided by the various agencies 122, 124, 126, the origination engine 110 can use the following equation to blend the down payment requirements from each of the three products into a single down payment percentage requirement.

$$\text{Consolidated down payment requirement} = (((\text{weight } A) \times (\text{percentage } A)) + ((\text{weight } B) \times (\text{percentage } B)) + ((\text{weight } C) \times (\text{percentage } C)))/n$$

In this example, each of the down payments requirements A, B, C is weighted and all are averaged by dividing by n (e.g., with n equaling the number of products being averaged). The weights can reflect various biases, such as an estimated percentage of the loans that are expected at a given down payment requirement. The consolidated down payment requirement is used as a term of the consolidated loan product 200. This simplifies the consolidated loan product 200, since the borrower need only understand a single down payment requirement as opposed to the disparate requirements for each of the loan products of the agencies 122, 124, 126.

In other examples, the terms for the various loan products of the agencies 122, 124, 126 can vary based upon factors such as geography (e.g., state-by-state variations), income requirements (e.g., income limits at a certain percentage of state or federal income guidelines), etc. Other terms of the consolidated loan product 200 can likewise be normalized into a single offering.

This process allows the origination of the loan to the home purchaser to be less complex, because the home purchaser does not need to understand all of the intricacies of all of the products offered by the various agencies. The process also allows the disposition engine 112 to dispose of the consolidated loan after origination to the appropriate agency, as described further below.

In addition to the differing terms associated with each of the loan products, the origination engine 110 can be programmed to address specific negotiated terms 208 that have been negotiated between the agencies 122, 124, 126 and the financial institution 106. For example, the system 100 can account for negotiated terms like special qualification requirements that may be negotiated between the financial institution 106 and the agencies 122, 124, 126. The negotiated terms can be in addition to or vary from the terms of the products from the agencies 122, 124, 126.

Further incentives and other specific configurations can also be associated with the consolidated loan product 200 offered by the system 100. For example, because the consolidated loan product 200 is directed in this example to new home purchasers, an incentive can be given to those purchasers that undergo specific educational requirements as part of the origination process. The education requirements can be made mandatory or discretionary.

In one example, the interest rate associated with the consolidated loan product 200 can be reduced if the purchaser completes an educational program geared for new home buyers and provides proof of the same to the system 100. In this scenario, the interest rate for the consolidated loan product 200 is reduced by a set amount, such as $\frac{1}{8}$ (0.125) percentage point. Other configurations are possible. For example, other aspects of the consolidated loan product 200 can be modified, such as closing costs (e.g., reduced), etc.

Figure 3:
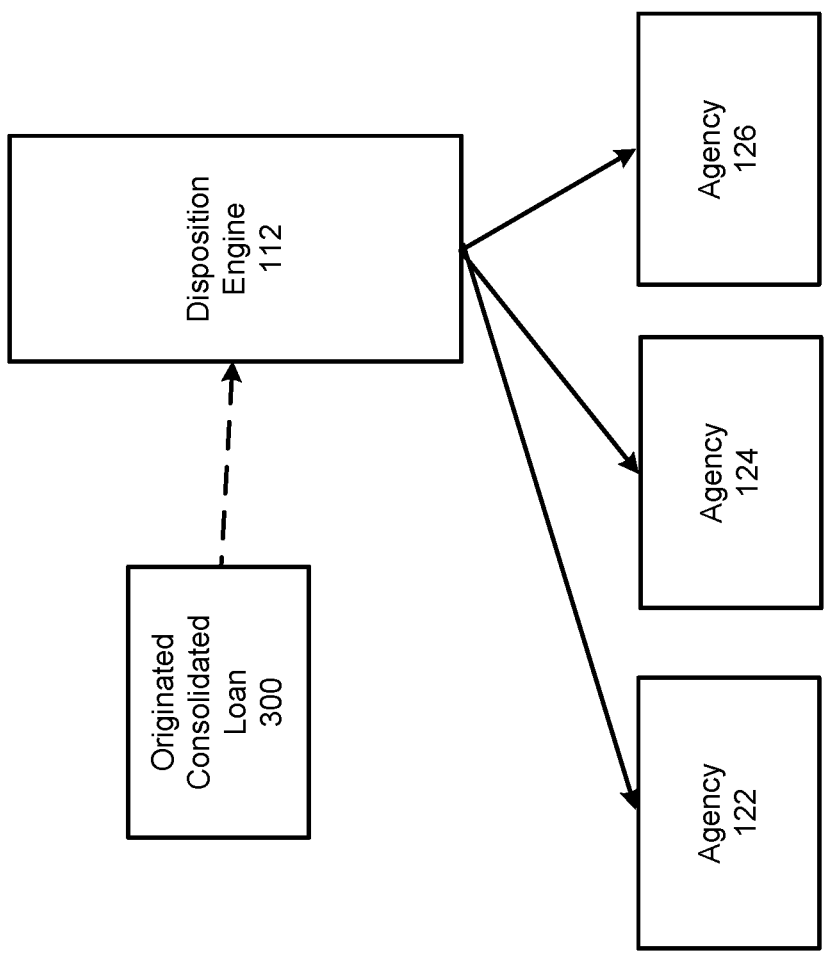
FIG. 3 shows an example disposition engine of the system of FIG. 1.

Referring to FIG. 3, once the consolidated loan product 200 has been originated, the origination engine 110 passes the originated consolidated loan 300 to the disposition engine 112. The disposition engine 112, in turn, validates the originated consolidated loan 300 and determines which of the loan products best fits the originated consolidated loan 300.

For example, the disposition engine 112 is programmed to periodically (e.g., hourly, daily, and/or weekly) review the terms of the originated consolidated loan 300 to determine if the terms meet standard requirements. For example, the different terms of the originated consolidated loan 300 are compared to expected values and rules are triggered if the terms deviate from those value. In one example, the loan-to-value ratio must be given in at least a pre-determined number of significant digits. If the loan-to-value ratio falls outside the rule (i.e., the loan-to-value ratio is not expressed with the required number of significant digits), the disposition engine 112 automatically corrects the deviation and/or flags the originated consolidated loan 300 for manual review and correction.

Further, the disposition engine 112 determines the best fit for the originated consolidated loan 300 with the plurality of loan products offered by the agencies 122, 124, 126. For example, once the terms of the originated consolidated loan 300 have been validated, the disposition engine 112 compares the terms of the originated consolidated loan 300 to the loan products provided by the various agencies 122, 124, 126 to select the product that is a best match for the originated consolidated loan 300. This can be accomplished by determining which terms of the originated consolidated loan 300 are most important (such as loan-to-value percentage) and determining for which loan products the originated consolidated loan 300 will qualify based upon those terms. One or more of the loan products are selected.

Once the appropriate loan product is selected, the disposition engine 112 sells, transfers, or otherwise disposes of the originated consolidated loan 300 by forwarding the originated consolidated loan 300 to the respective agency 122, 124, 126 associated with the selected loan product. For example, if the disposition engine 112 determines that the "Home Possible Program" is the appropriate loan product, the disposition engine 112 sells the originated consolidated loan 300 to Freddie Mac. Other configurations are possible.

Figure 4:
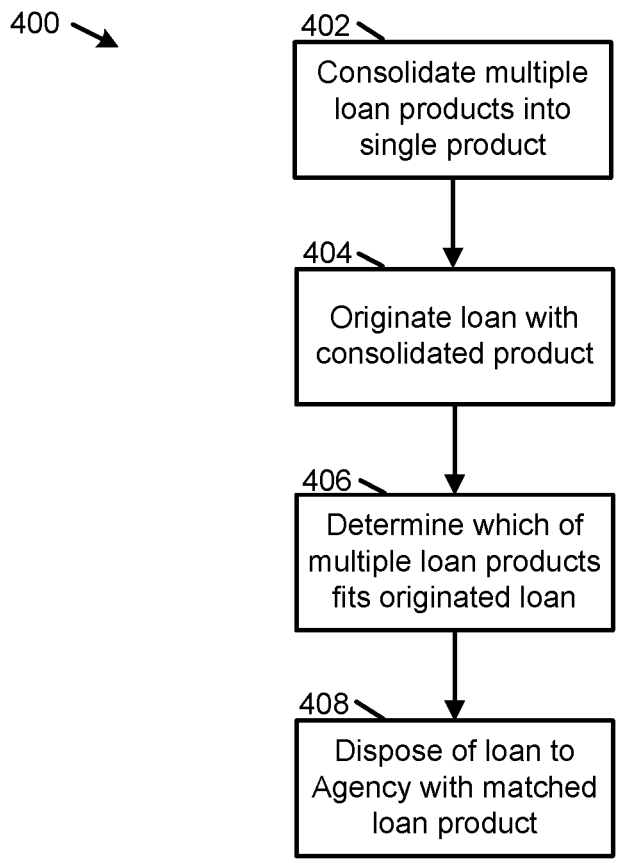
FIG. 4 shows an example method for facilitating a consolidated loan product.

Referring now to FIG. 4, an example method 400 for facilitating the consolidated loan product is shown. The method 400 can be performed by, for example, the system 100.

In operation 402 of the method 400, the consolidated loan product is formed by normalizing the terms of a plurality of loan products offered by third parties, such as the government agencies described above. Examples of the consolidation process are provided above.

Next, at operation 404, a consolidated loan product is originated for a home purchaser. This process is more efficient because the entities associated with the origination of the consolidated loan, such as the purchaser, home mortgage consultant, and realtor, are not required to understand all of the complexities associated with the individual loan products. The purchaser only needs to understand the singular terms of the consolidated loan.

At operation 406, the integrity of the consolidated loan is checked and a determination is made as to which loan program is a best fit for the originated consolidated loan. This can be based upon multiple factors, as described further herein.

Figure 5:
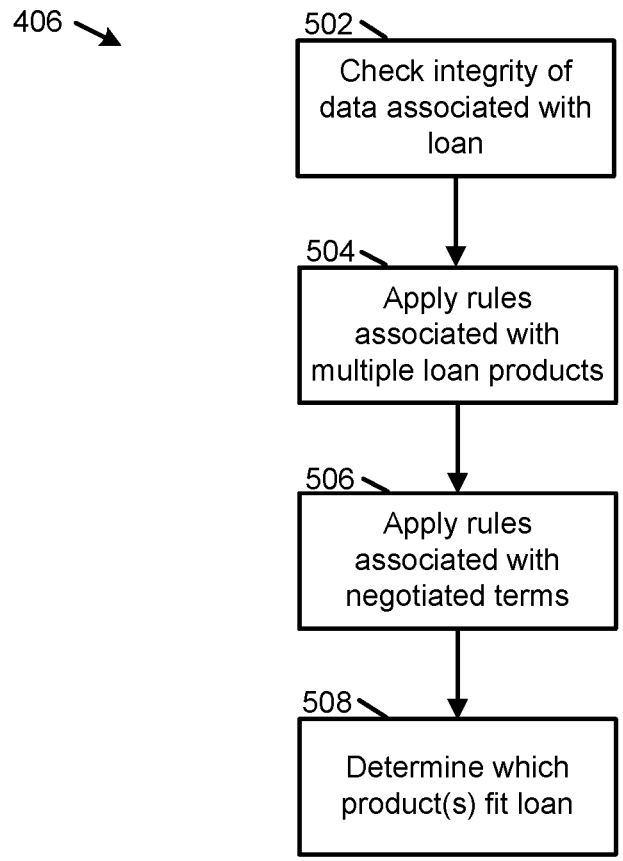
FIG. 5 shows an example method for selecting a loan product for the consolidated loan product of FIG. 4.

For example, FIG. 5 provides additional details about the validation and fitting of operation 406. At operation 502, the data associated with the originated consolidated loan is checked for compliance with various rules. Next, at operations 504, 506, the terms of the various loan products and negotiated terms are applied to determine a best fit for the originated consolidated loan. Finally, at operation 508, the best fit loan product for the originated consolidated loan is selected.

Finally, referring again to FIG. 4, at operation 408, the originated consolidated loan is disposed of by selling and/or otherwise transferring the loan to the respective agency responsible for the selected loan program.

There can be various technical advantages associated with the systems and methods described herein. For example, the computing devices of the financial institution 106 can be optimized using the engines 110, 112 to normalize, originate, and select a best fit for a consolidated loan product from a plurality of products. These processes allow the engines 110, 112 to perform more efficiently to handle many loan requests with less computing power and in a shorter amount of time. This can result in an overall system that is faster, uses less computing power, and is able to handle an increased number of loan requests.

Figure 6:
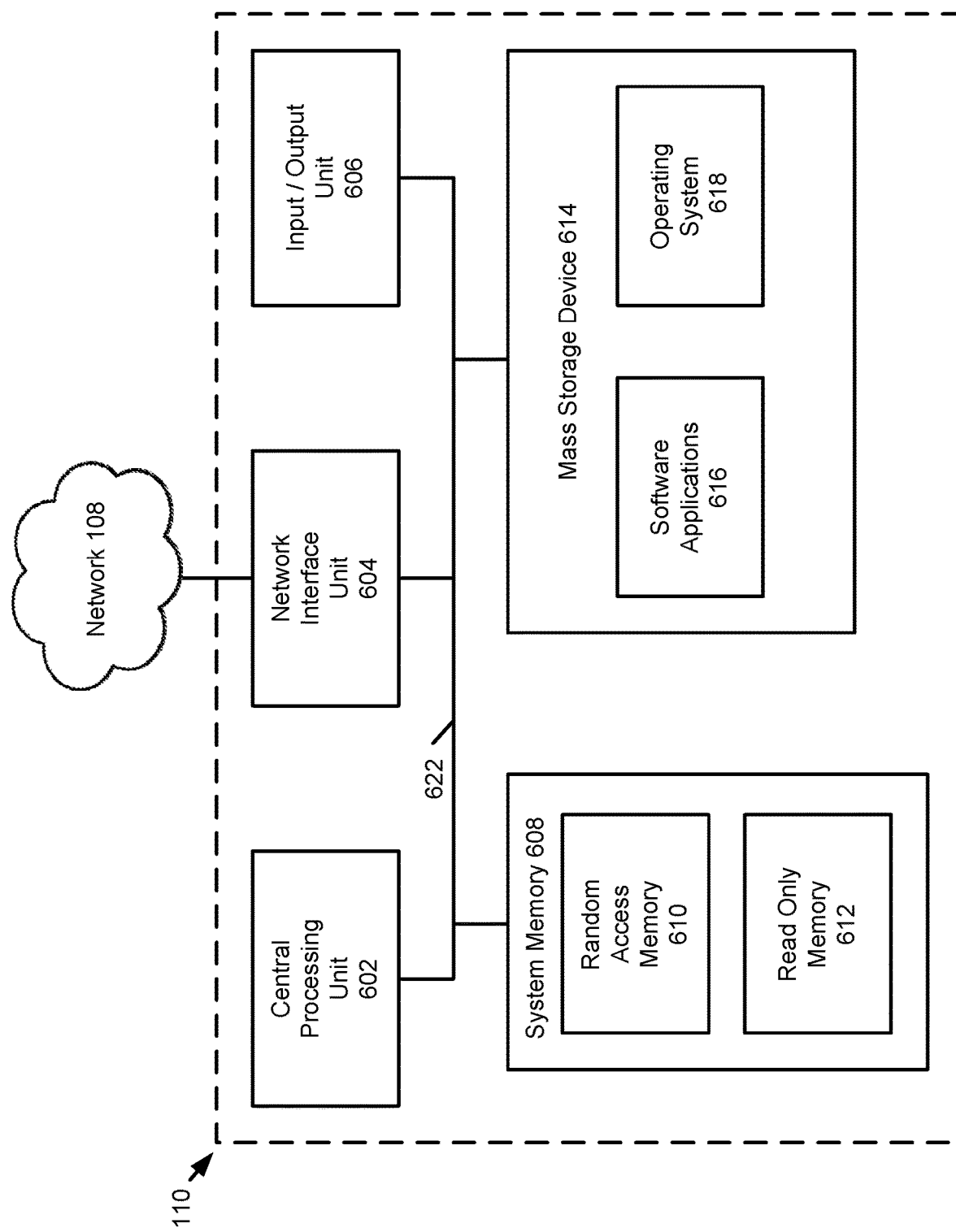
FIG. 6 shows an example computing device that functions as the origination engine of the system of FIG. 1.

As illustrated in the example of FIG. 6, the origination engine 110 (and likewise the disposition engine 112) can be implemented as one or more computing devices. In this example, the origination engine 110 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the origination engine 110, such as during startup, is stored in the ROM 612. The origination engine 110 further includes a mass storage device 614. The mass storage device 614 is able to store software instructions and data.

The mass storage device 614 is connected to the CPU 602 through a mass storage controller (not shown) connected to the system bus 622. The mass storage device 614 and its associated computer-readable data storage media provide non-volatile, non-transitory storage for the origination engine 110. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the origination engine 110.

According to various embodiments of the invention, the origination engine 110 may operate in a networked environment using logical connections to remote network devices through the network 620, such as a wireless network, the Internet, or another type of network. The origination engine 110 may connect to the network 620 through a network interface unit 604 connected to the system bus 622. It should be appreciated that the network interface unit 604 may also be utilized to connect to other types of networks and remote computing systems. The origination engine 110 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the origination engine 110 can store software instructions and data. The software instructions include an operating system 618 suitable and one or more software applications 616 for controlling the operation of the origination engine 110. The mass storage device 614 and/or the RAM 610 also store software instructions, that when executed by the CPU 602, cause the origination engine 110 to provide the functionality of the origination engine 110 discussed in this document. For example, the mass storage device 614 and/or the RAM 610 can store software instructions that, when executed by the CPU 602, cause the origination engine 110 to normalize terms from a plurality of loan products and present a consolidated loan product to a potential borrower.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for facilitating a home mortgage of a borrower, the method comprising:
   querying, with one or more processors, one or more databases to obtain terms for a plurality of loan products for the home mortgage;
   normalizing, with the one or more processors, the plurality of loan products into a consolidated loan product;
   providing, with the one or more processors and for presentation at a display of a borrower computing device, a simplified user interface generated to include only one set of loan product terms, wherein the only one set of loan product terms is for the consolidated loan product;
   originating the consolidated loan product for the borrower; and
   after originating of the consolidated loan product:
      determining, with the one or more processors, a best fit for the consolidated loan product from among the plurality of loan products, wherein determining the best fit includes applying one or more rules; and
      transferring the consolidated loan product to an entity associated with the best fit from the plurality of loan products.

2. The method of claim 1, wherein the determining the best fit for the consolidated loan product after origination of the consolidated loan product is performed as part of a batch process.

3. The method of claim 1, wherein the determining the best fit for the consolidated loan product after origination of the consolidated loan product is performed offline.

4. The method of claim 1, wherein the querying includes querying the one or more databases with an SQL query.

5. The method of claim 1, wherein normalizing the plurality of loan products into the consolidated loan product includes:
   determining likelihoods of how many loans are to be originated at each of multiple different down payment requirements; and
   determining a down payment of the consolidated loan product based on the likelihoods.

6. The method of claim 1, wherein normalizing the plurality of loan products into the consolidated loan product includes:
   calculating a weighted average of an aspect of multiple different loan products.

7. The method of claim 1, wherein the normalizing further comprises:
   determining a plurality of loan terms associated with each of the plurality of loan products;
   determining a plurality of negotiated terms associated with the plurality of loan products; and
   combining the plurality of loan terms and the plurality of negotiated terms into the consolidated loan product.

8. A computing device, comprising:
   at least one processor; and
   memory encoding instructions that, when executed by the at least one processor, cause the at least one processor to:
      query one or more databases to obtain terms for a plurality of loan products;
      normalize the plurality of loan products into a consolidated loan product;
      provide, for presentation at a display of another computing device, a simplified user interface generated to include only one set of loan product terms, wherein the only one set of loan product terms is for the consolidated loan product;
      originate the consolidated loan product;
      after origination of the consolidated loan product, determine a best fit for the consolidated loan product from among the plurality of loan products, wherein to determine the best fit includes applying one or more rules; and
      transfer the consolidated loan product to an entity associated with the best fit from the plurality of loan products.

9. The computing device of claim 8, wherein to determine the best fit for the consolidated loan product after origination of the consolidated loan product includes to perform the best fit for the consolidated loan product as part of a batch process.

10. The computing device of claim 8, wherein to determine the best fit for the consolidated loan product after origination of the consolidated loan product includes to determine the best fit offline.

11. The computing device of claim 8, wherein to query the one or more databases includes to query the one or more databases using an SQL query.

12. The computing device of claim 8, wherein to normalize the plurality of loan products into the consolidated loan product includes to:
   determine likelihoods of how many loans are to be originated at each of multiple different down payment requirements; and
   determine a down payment of the consolidated loan product based on the likelihoods.

13. The computing device of claim 8, wherein to normalize the plurality of loan products into the consolidated loan product includes to:
   calculate a weighted average of an aspect of multiple different loan products.

14. The computing device of claim 8, wherein the instructions further cause the at least one processor to:
   determine a plurality of loan terms associated with each of the plurality of loan products;
   determine a plurality of negotiated terms associated with the plurality of loan products; and
   combine the plurality of loan terms and the plurality of negotiated terms into the consolidated loan product.

15. A tangible computer readable medium encoding instructions that, when executed by at least one processor, cause the at least one processor to:
   query one or more databases to obtain terms for a plurality of loan products;
   normalize the plurality of loan products into a consolidated loan product;
   provide, for presentation at a display of a borrower computing device, a simplified user interface generated to include only one set of loan product terms, wherein the only one set of loan product terms is for the consolidated loan product;
   originate the consolidated loan product for a borrower;
   after origination of the consolidated loan product, determine a best fit for the consolidated loan product from among the plurality of loan products, wherein to determine the best fit includes applying one or more rules; and
   transfer the consolidated loan product to an entity associated with the best fit from the plurality of loan products.

16. The tangible computer readable medium of claim 15, wherein to determine the best fit for the consolidated loan product after origination of the consolidated loan product includes to perform the best fit for the consolidated loan product as part of a batch process.

17. The tangible computer readable medium of claim 15, wherein to determine the best fit for the consolidated loan product after origination of the consolidated loan product includes to determine the best fit offline.

18. The tangible computer readable medium of claim 15, wherein to normalize the plurality of loan products into the consolidated loan product includes to:
- determine likelihoods of how many loans are to be originated at each of multiple different down payment requirements; and
- determine a down payment of the consolidated loan product based on the likelihoods.

19. The tangible computer readable medium of claim 15, wherein to normalize the plurality of loan products into the consolidated loan product includes to:
- calculate a weighted average of an aspect of multiple different loan products.

20. The tangible computer readable medium of claim 15, wherein the instructions further cause the at least one processor to:
- determine a plurality of loan terms associated with each of the plurality of loan products;
- determine a plurality of negotiated terms associated with the plurality of loan products; and
- combine the plurality of loan terms and the plurality of negotiated terms into the consolidated loan product.

* * * * *